United States Patent [19]
Luoma

[11] Patent Number: 5,868,328
[45] Date of Patent: Feb. 9, 1999

[54] WHEEL CRUSHING AND TIRE CUTTING APPARATUS

[75] Inventor: Eugene H. Luoma, Duluth, Minn.

[73] Assignee: Design Pro of Duluth, Inc., Duluth, Minn.

[21] Appl. No.: 950,345

[22] Filed: Oct. 14, 1997

[51] Int. Cl.[6] .................................................. B02C 19/12
[52] U.S. Cl. ...................... 241/101.2; 83/951; 100/100; 100/232; 241/101.72; 241/101.76; 241/DIG. 31
[58] Field of Search ............................... 83/951; 100/100, 100/232; 72/389.6; 241/DIG. 31, 101.76, 101.72, 101.2, 283, 262

[56] References Cited

U.S. PATENT DOCUMENTS

| | | | |
|---|---|---|---|
| 3,113,508 | 12/1963 | Trachtman | 100/232 |
| 4,080,887 | 3/1978 | Larsen | 100/232 |
| 4,083,394 | 4/1978 | Heikkinen et al. | 100/232 |
| 4,387,636 | 6/1983 | Depew et al. | 100/232 |
| 4,804,031 | 2/1989 | Rouse et al. | 72/389.6 |

FOREIGN PATENT DOCUMENTS 1037281 7/1966 United Kingdom ................... 100/232

OTHER PUBLICATIONS

Multitek, Inc., *Squeeze Greater Profits out of Scrap Wheels.* . . .

Recyclers Power Source, May, 1997, pp. 3,4,19,31.

*Primary Examiner*—Mark Rosenbaum
*Attorney, Agent, or Firm*—Gerald E. Helget, Esq.; Mackall, Crounse & Moore, PLC

[57] ABSTRACT

A wheel crushing apparatus for crushing scrap vehicle wheels to prepare the scrap wheels for recycling, the scrap wheels having a tire mounted on the wheel, consists of an engine, a hydraulic pump driven by the engine, a single hydraulic cylinder and piston driven by the hydraulic pump, a crushing head to hold the wheel and tire for crushing the wheel, a number of crushing arms concentric about the crushing head, and radially movable between an extended position wherein the crushing arms contact the tire tread and a contracted position wherein the wheel is crushed, and a linkage connecting all of the crushing arms to the single hydraulic piston, so that all of the crushing arms are driven by the single hydraulic piston between the extended position and the contracted position.

37 Claims, 7 Drawing Sheets

WHEEL CRUSHING AND TIRE CUTTING APPARATUS

BACKGROUND OF THE INVENTION

The present invention relates to an apparatus for crushing scrap vehicle wheels to prepare the scrap wheels for recycling, and for cutting tires to prepare the tires for recycling.

The emphasis in today's society on recycling materials continues to increase. Wheels from vehicles that have been damaged in accidents or otherwise made inoperative represent a large amount of both metal and rubber that can be recycled. Recycling these scrap vehicle wheels can be a source of considerable profit.

Additionally, scrap vehicle wheels take up a large amount of space in salvage yards, space which could be profitably used for receiving and storing other scrap.

Furthermore, a salvage yard owner can take advantage of periodic cyclical dips in the amount of available scrap processing work by making it possible for his employees efficiently to crush vehicle wheels and cut vehicle tires for recycling.

Generally, uncrushed scrap vehicle wheels are too bulky to ship to a recycler. Consequently, recyclers generally will not accept uncrushed scrap vehicle wheels. Furthermore, the rubber tires attached to scrap vehicle wheels must often be sent to a different recycler from the wheels, and the rubber recyclers frequently will not accept whole tires.

There is therefore a need for an apparatus which efficiently crushes scrap vehicle wheels and cuts the tires into segments for recycling.

Earlier wheel crushing devices had a number of problems which this invention solves.

First, some earlier devices did not securely hold the vehicle wheel during the crushing process, so that the wheel could actually fly out of the device under the crushing force, with great danger to personnel. This defect was most often associated with a crushing device which exerted a linear crushing force against the wheel, rather than crushing the wheel radially.

Radial crushers were subject to a different problem. Most of these devices used a number of independently operated hydraulic crushing arms arranged concentrically around the wheel. As the crushing process continued, each crushing arm would experience a different resistance to the crushing force, with the result that the hydraulic fluid in each of the independent hydraulic cylinders developed a different pressure. Because of this, the engine and hydraulic cylinders had to be overconfigured. For example, the specifications for the Multitek WC-500 Wheel Crusher (Multitek, Inc., P.O. Box 248, Prentice, Wis. 54556) indicate a 35 h.p. engine and a 15 gallon hydraulic pump.

Another disadvantage of earlier radial crushers is that the independently operated hydraulic crushing arms required separate, duplicated components, increasing the cost of the device and leading to additional points of failure. If any one of the radial crushing arms became inoperative, the entire device was then inoperative.

Another disadvantage of earlier wheel crushers was that the crushing head, that is, the component which holds the wheel for crushing, was mounted parallel to the ground at such a height that the operator had to bend over to mount a heavy wheel for crushing. Over the course of crushing many wheels, this produces a great deal of fatigue and leads to the possibility of back injuries.

Still another disadvantage of earlier crushing devices was that a separate device was required to cut tires.

Applicant's novel wheel crusher and tire cutter solves the above problems.

SUMMARY OF THE INVENTION

A wheel crushing apparatus for crushing scrap vehicle wheels to prepare the scrap wheels for recycling, the scrap wheels having a tire mounted on the wheel, consists of an engine, a hydraulic pump driven by the engine, a single hydraulic cylinder and piston driven by the hydraulic pump, a crushing head to hold the wheel and tire for crushing the wheel, a number of crushing arms concentric about the crushing head, and radially movable between an extended position wherein the crushing arms contact the tire tread and a contracted position wherein the wheel is crushed, and a linkage connecting all of the crushing arms to the single hydraulic piston, so that all of the crushing arms are driven by the single hydraulic piston between the extended position and the contracted position.

A principal object and advantage of the present invention is that all of the crushing arms are driven by a single hydraulic cylinder and piston.

Another principal object and advantage of the present invention is that it includes a linkage between the hydraulic piston and the crushing arms so that progressively increasing mechanical advantage is present as the linkage is driven by the piston.

Another object and advantage of the present invention is that the wheel and tire are held securely in the crushing apparatus during crushing, with no possibility of the wheel flying out of the apparatus and injuring the operator.

Another object and advantage of the present invention is that there is no possibility of differential hydraulic pressure building up in several hydraulic cylinders. Therefore the engine and hydraulic pump do not have to be overconfigured.

Another object and advantage of the present invention is that it uses fewer moving parts, is less expensive, and less subject to mechanical breakdown.

Another object and advantage of the present invention is that it is mounted on a platform at such an angle and height that an operator does not have to bend over to mount a heavy wheel on the apparatus.

Another object and advantage of the present invention is that a tire-cutting attachment may be mounted on the device, using the same engine and hydraulic components used for wheel crushing.

DETAILED DESCRIPTION OF THE PREFERRED EMBODIMENTS

Figure 1:
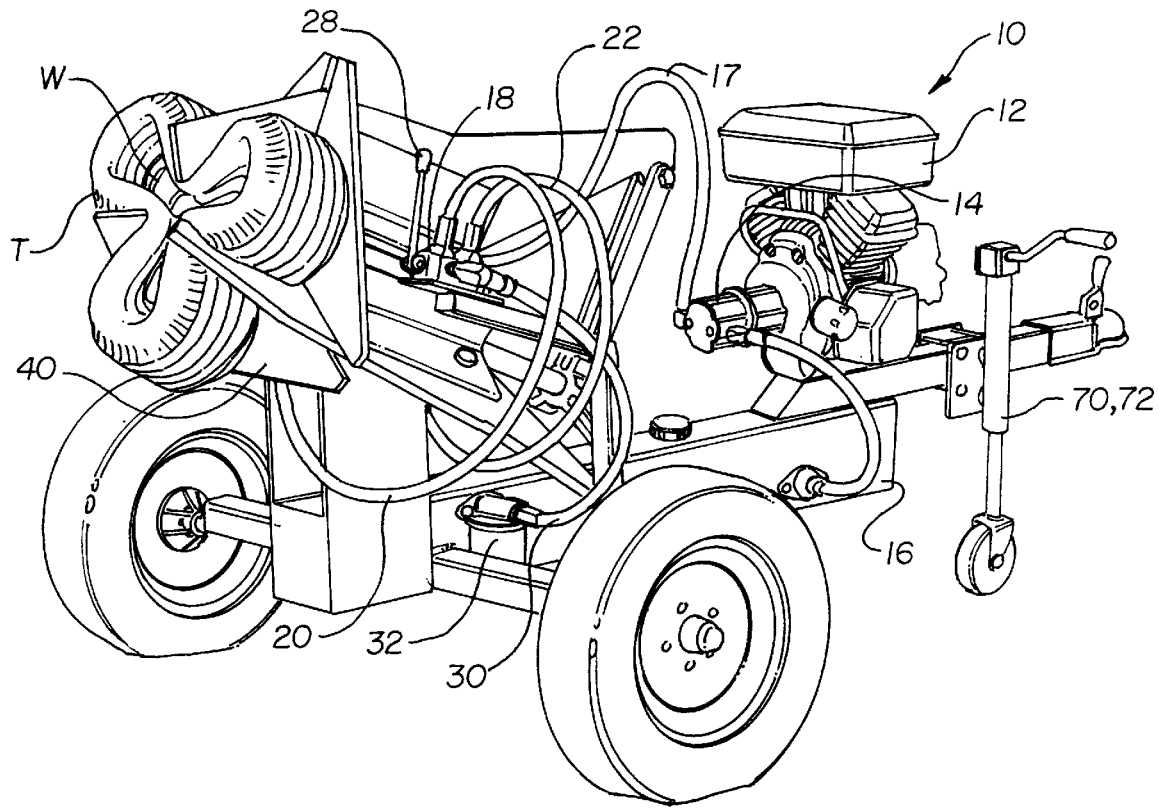
FIG. 1 is a perspective view of the wheel crushing and tire cutting apparatus of the present invention.
Figure 2:
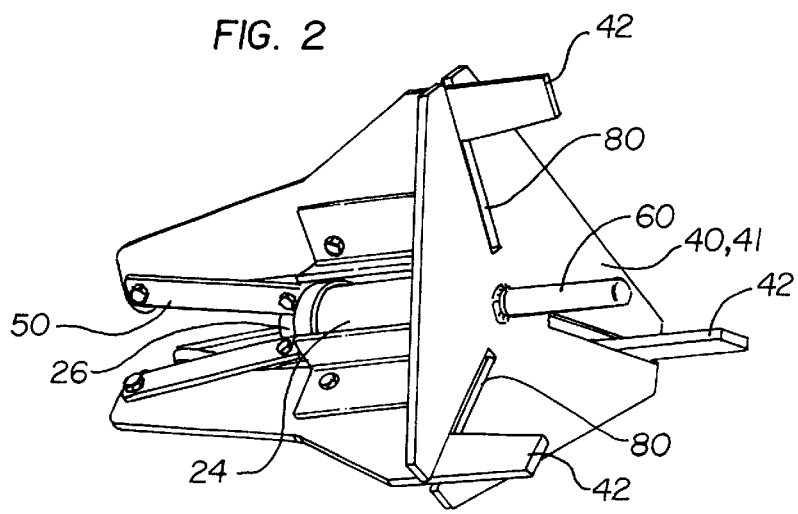
FIG. 2 is a detailed perspective view of the crushing head with the crushing arms extended.

The wheel crushing apparatus of the present invention is generally shown in the Figures as reference numeral 10.

The wheel crushing apparatus 10 preferably has an engine 12, which may be either electric or gasoline powered. Preferably, the engine 12 has less than or equal to about 16 horsepower. This is sufficient horsepower to drive the single hydraulic cylinder 24 and piston 26. Unlike earlier devices, there is no possibility of a differential hydraulic pressure developing across multiple pistons, so the engine can have less horsepower.

The engine 12 is connected to a hydraulic pump 14, which supplies hydraulic power to the crushing device 10. The hydraulic pump 14 receives hydraulic fluid from a reservoir 16, which preferably has a capacity of about 7 gallons. Since there is only one hydraulic cylinder and piston, the reservoir does not need to hold more than about 7 gallons. An input hose 17 runs from the hydraulic pump 14 to a manifold 18.

From the manifold 18, hydraulic hoses 20, 22 run to a single hydraulic cylinder 24 and piston 26. One hose 20 runs to the front of the hydraulic cylinder 24 and the other hose 22 runs to the rear of the hydraulic cylinder 24.

At the manifold, a piston actuator lever 28 controls the flow of hydraulic fluid to the piston 26. In a neutral position, no hydraulic fluid flows to the piston 26. In a forward position, hydraulic fluid flows through rear hose 22 to the piston 26, driving the piston forward toward the wheel to be crushed. In a rear position, hydraulic fluid flows to the forward hose 20, driving the piston 26 rearward away from the wheel to be crushed.

Fluid returns from the manifold 18 through output hose 30 and filter 32 to the reservoir 16.

A crushing head 40 is adapted to hold the wheel W and tire T for crushing the wheel W.

Figure 4:
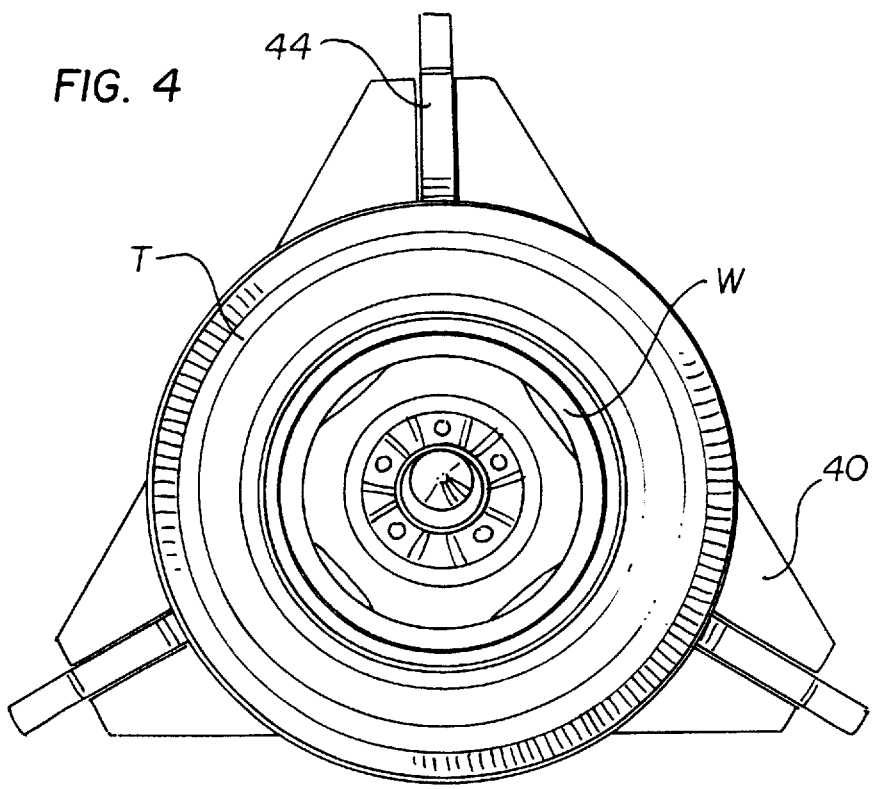
FIG. 4 is a front elevational view of the crushing head with a wheel and tire mounted thereon for crushing and cutting.
Figure 7:
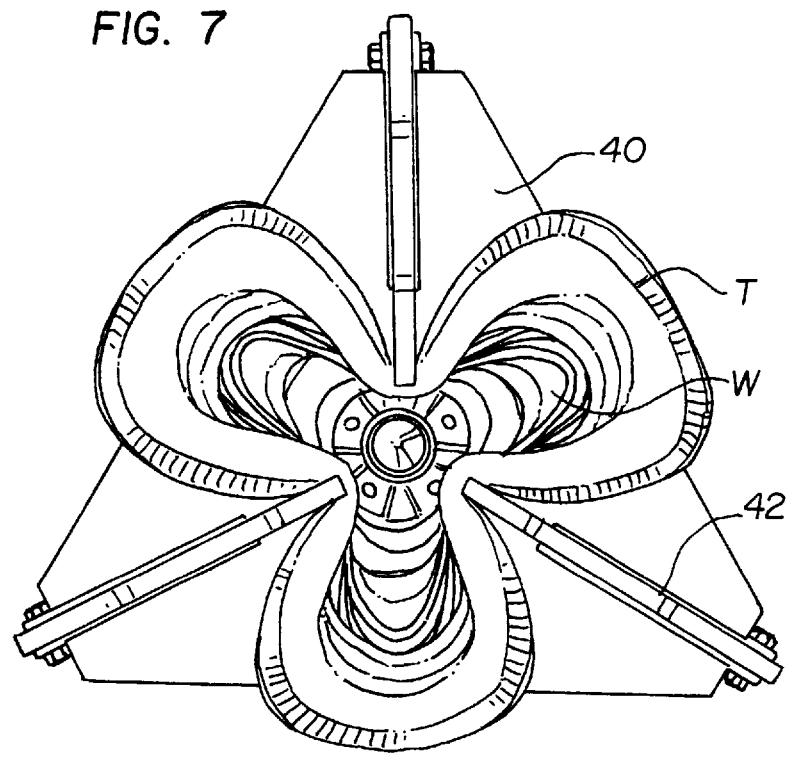
FIG. 7 is a front elevational view of the crushing head also showing a crushed wheel.
Figure 8:
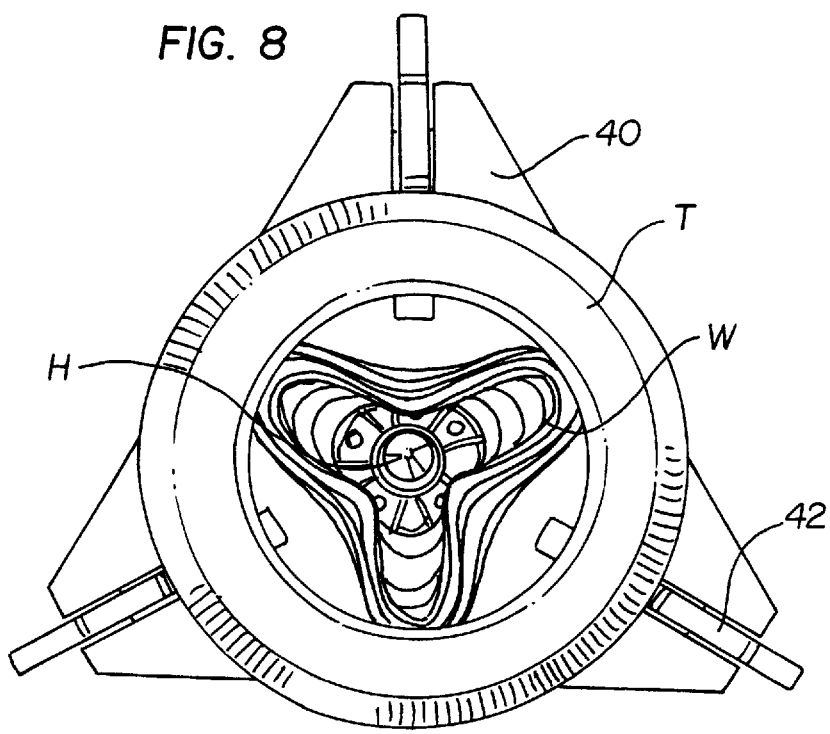
FIG. 8 is a front elevational view of the crushing head also showing a crushed wheel with the crushing arms in the extended position for removing the tire from the crushed wheel.
Figure 9:
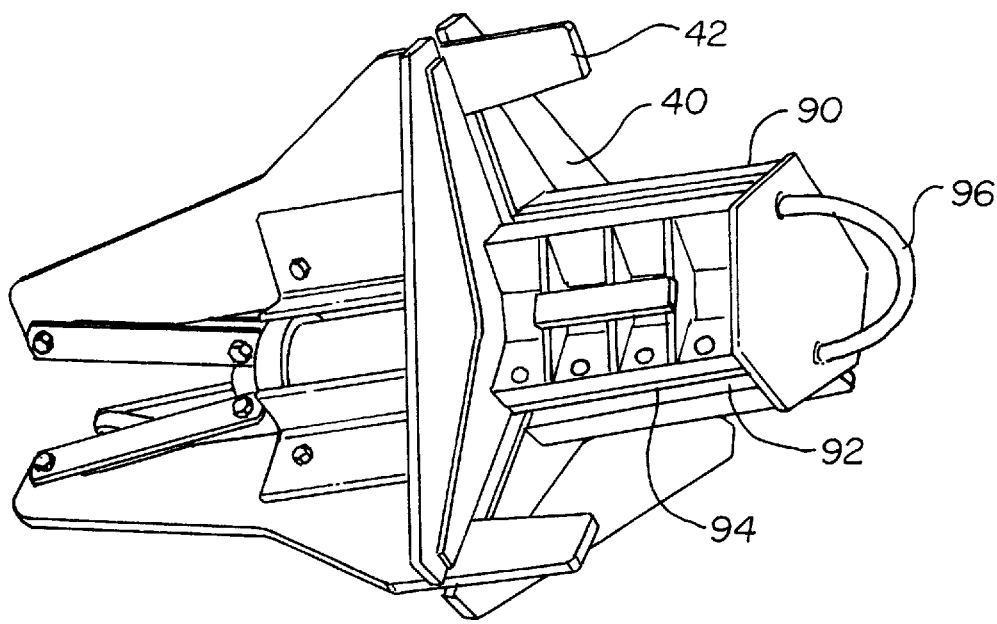
FIG. 9 is a detailed perspective view of the crushing head with the tire cutting block mounted thereon.

A plurality of crushing arms 42 are concentric about the head 40. The crushing arms 42 are radially movable between an extended position wherein the arms 42 contact the tread of the tire T, as shown in FIG. 4; and a contracted position wherein the wheel is crushed, as shown in FIG. 7. The crushing arms are then moved to the extended position (FIG. 8), so that the tire T can be removed from the crushed wheel W.

A linkage 50 connects each of the crushing arms 42 to the single hydraulic piston 26. The linkage 50 allows all of the crushing arms 42 to be driven by the single piston 26 between the extended position and the contracted position.

In the preferred embodiment, each crushing arm 42 has a first end 44 contacting the tread of the tire T; a second end 46; a fulcrum 48 between the first end 44 and the second end 46; the crushing arm 42 pivoting on the fulcrum 48; the second end 46 being pivotally connected to the linkage 50 by first pivot pin 47; the linkage 50 being pivotally connected to the piston 26 by second pivot pin 49.

Figure 3:
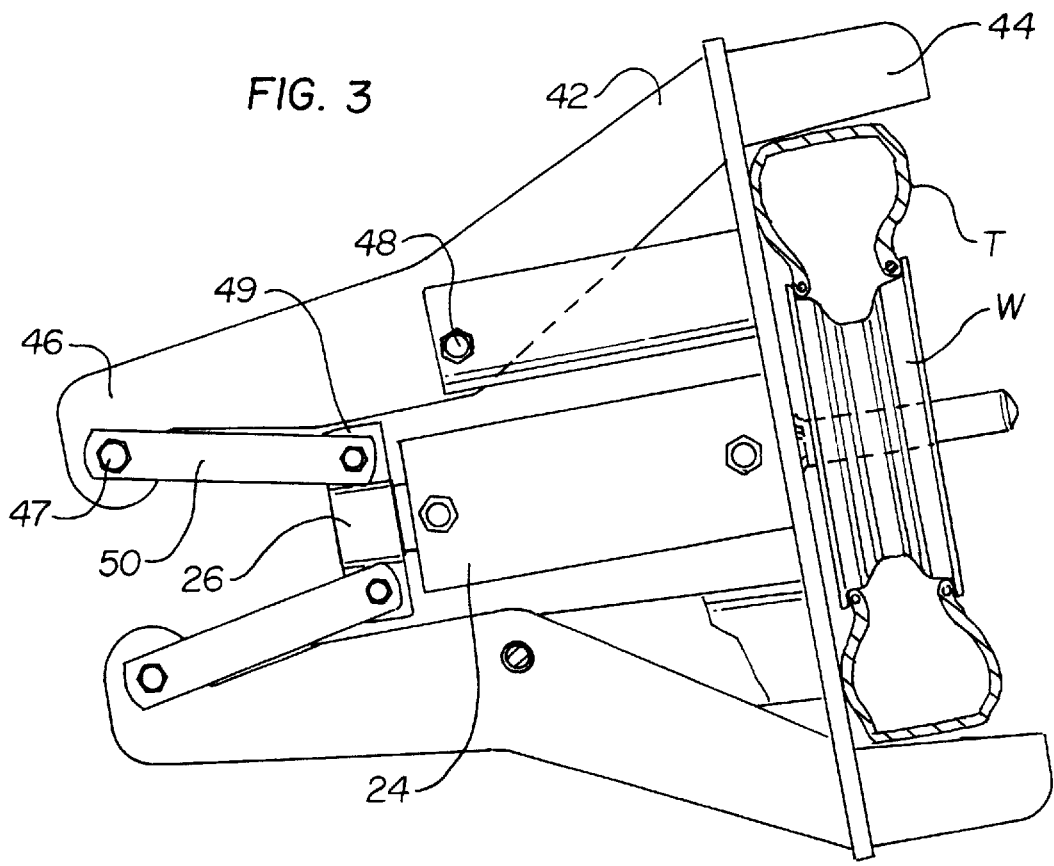
FIG. 3 is a side elevational view of the crushing head with some detail shown in phantom.
Figure 5:
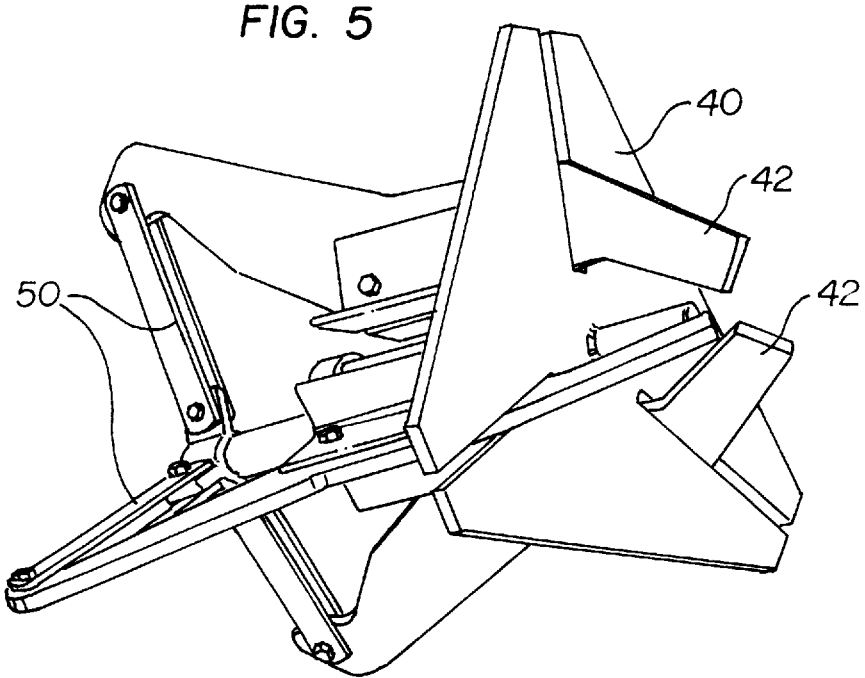
FIG. 5 is a detailed perspective view of the crushing head with the crushing arms contracted.
Figure 6:
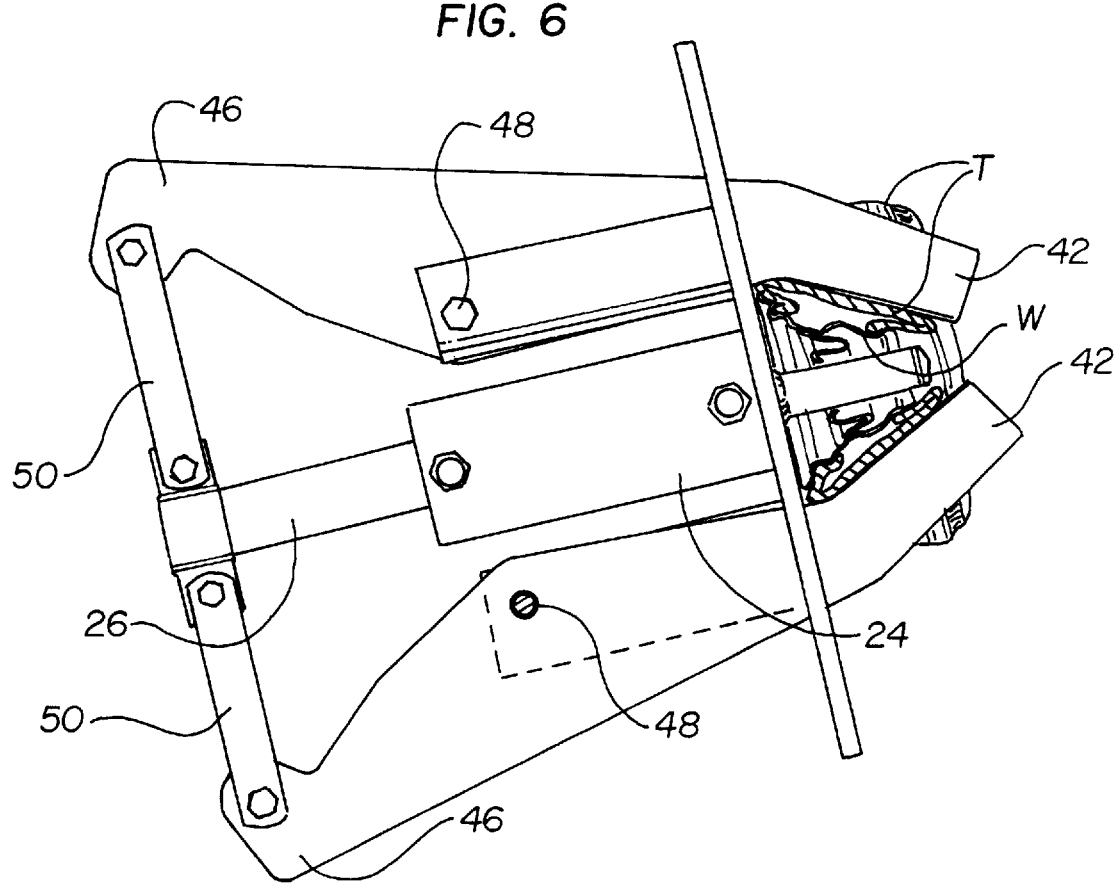
FIG. 6 is a side elevational view of the crushing head also showing a crushed wheel.

As can be seen in FIGS. 3, 5, and 6, this arrangement allows movement of the piston 26 away from the crushing head 40 to cause the crushing arms 42 to pivot on the fulcrum 48 radially toward each other. Conversely, movement of the piston 26 toward the crushing head 40 causes the crushing arms 42 to pivot on the fulcrum 48 radially away from each other.

The particular arrangement of the linkage 50 in the preferred embodiment allows the progressive increase in mechanical advantage as the linkage 50 causes the arms 42 to pivot radially toward each other. The following table illustrates the movement of the arms 42 in relation to the movement of the piston 26.

| CYLINDER MOVEMENT | ARM MOVEMENT |
| --- | --- |
| First 3 inches | 1 inch |
| Next 1 inch | 1 inch |
| Next 1 inch | 2 inches |
| Next 1 inch | 4 inches |
| Next 1 inch | 8 inches |
| Next 1 inch | 16 inches |

To aid in the mounting of the wheel W, the crushing head 40 preferably has a guide finger 60 which engages the wheel hub H thereby centering the wheel W on the crushing head 40.

A mobile platform 70 is preferably used for transporting the apparatus 10. In one embodiment, the platform 70 is a trailer 72 attachable to a towing vehicle (not shown).

In another embodiment, the platform 70 comprises a self-powered vehicle. For example, the platform 70 may comprise an excavator 74 with a retractable arm 76, the crushing head 40 being mounted on the arm 76. In such a case, engine and/or hydraulic power could be supplied to the crushing head 40 from the excavator 74.

In the preferred embodiment, the crushing head 40 further comprises a plurality of radial slots 80, each crushing arm 42 moving radially in one of the radial slots 80. This allows the crushing head 40 to have a solid base 41 against which the wheel W may be mounted, while still allowing the radial motion of the arms 42.

In addition, the apparatus 10 may further comprise a tire cutting block 90, preferably centrally mountable on the crushing head 40. Conveniently, the block 90 may mount on the guide finger 60. To achieve this, the block 90 may have a central channel or core (not shown) which receives the guide finger 60.

In the preferred embodiment, the tire cutting block 90 further comprises a plurality of tire cutting channels 92. Each cutting channel 92 receives one of the crushing arms 42. To cut the tire, the tire T is removed from the crushed wheel W, the crushed wheel is removed from the head 40, the tire cutting block 90 is mounted on the head 40, and the tire is mounted on the crushing head 40 between the arms 42 and the tire cutting block 90. The easy removability of the cutting block 90 allows each wheel and tire to be individually processed, or for batches of wheels to be processed followed by batches of tires.

Figure 10:
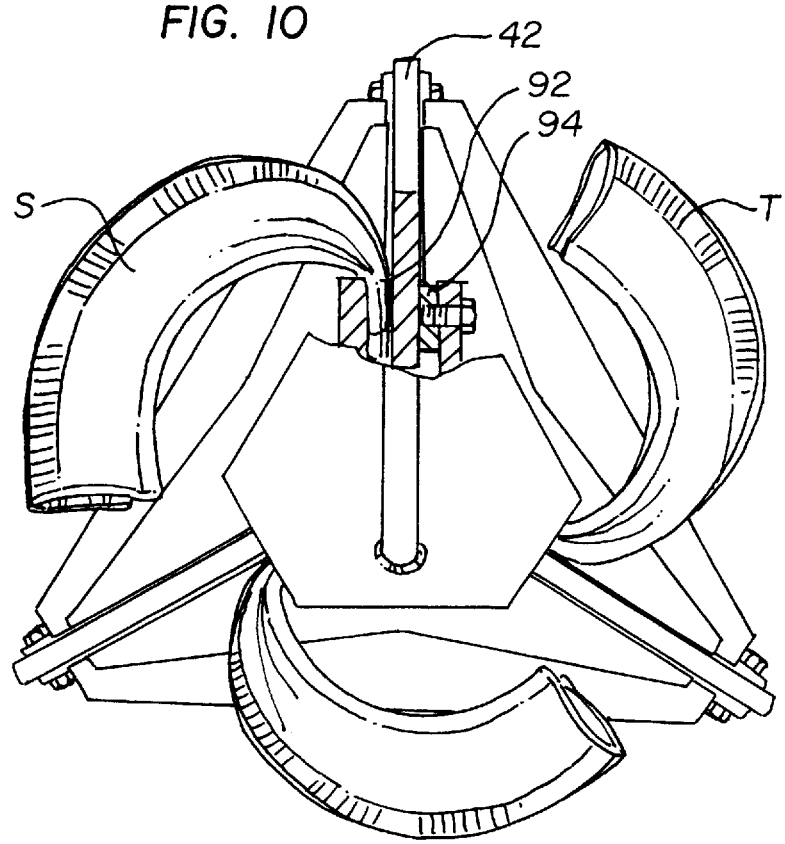
FIG. 10 is a front elevational view of the crushing head and tire cutting block after a tire has been cut.
Figure 11:
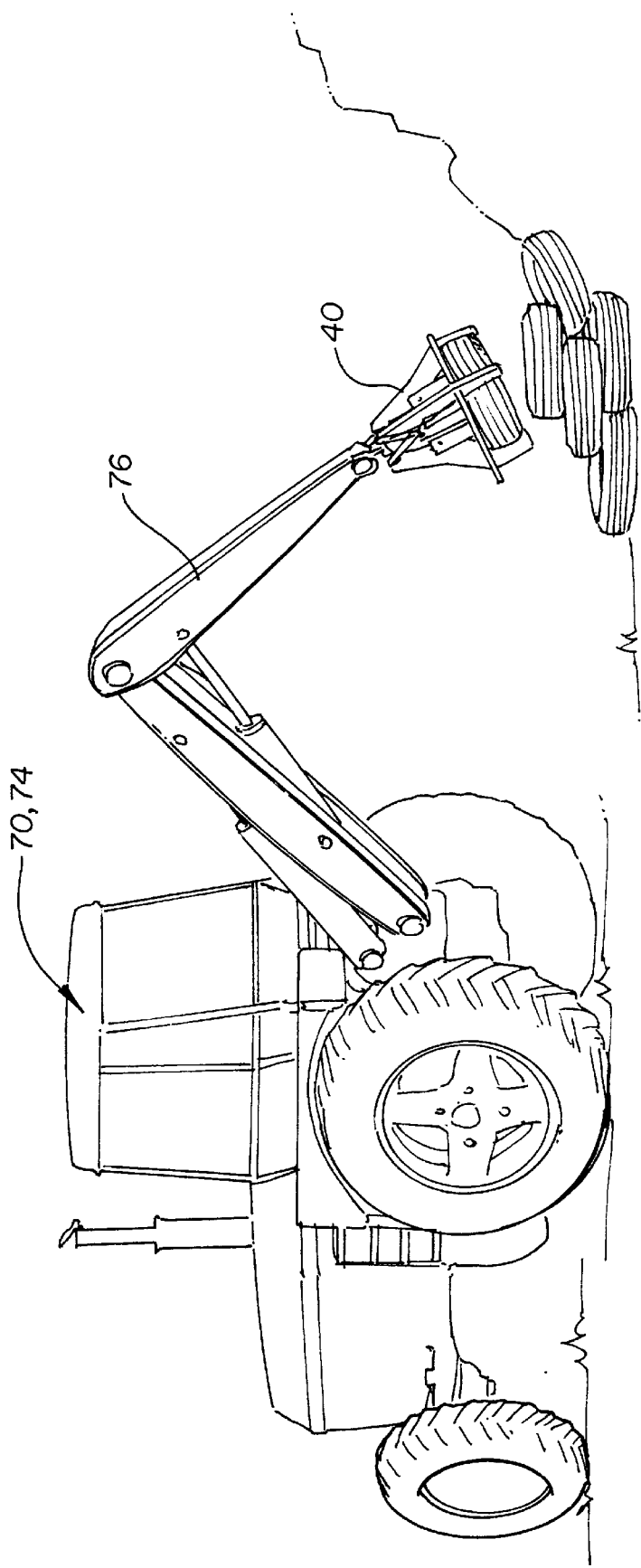
FIG. 11 is a perspective view of an excavator with the crushing head attached to the arm.

As the arms 42 move radially toward each other, the arms 42 force the tire T against the cutting channels 92, cutting the tire. At the same time, the arms 42 hold one end of the cut tire segment S within the cutting channel 92, as shown in FIG. 10. This prevents the cut tire segments from flying off the machine and potentially injuring the operator.

To enhance the cutting ability of the apparatus, a hardened cutting bar 94 may be mounted in each of the cutting channels 92, and the tire is cut by being forced against the cutting bar 94.

A handle 96 may be attached to the cutting block 90 to allow the operator to easily mount and remove the cutting block 90 from the crushing head 40.

Figure 12:
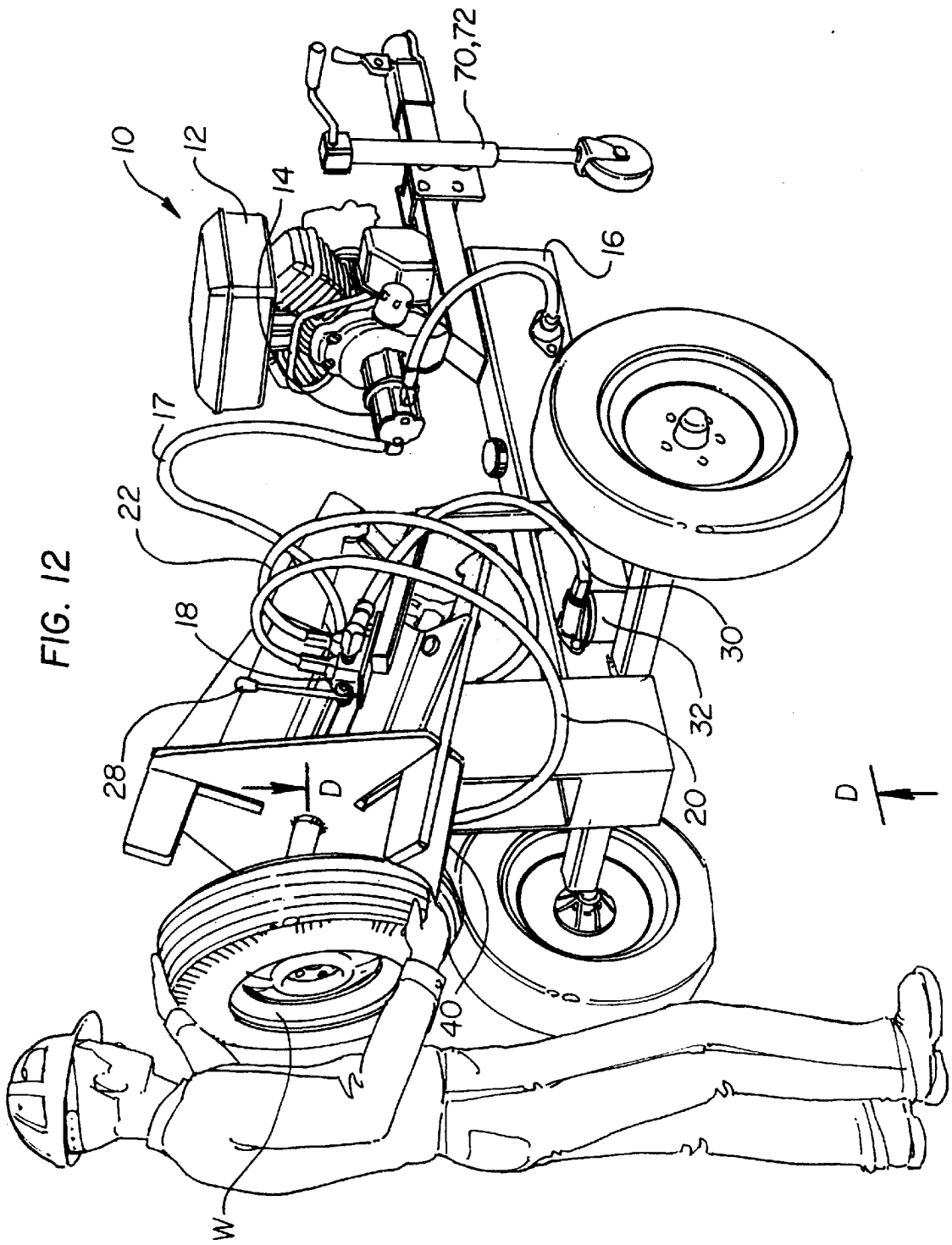
FIG. 12 is a perspective view of the wheel crushing and tire cutting apparatus of the present invention showing an operator mounting a wheel on the apparatus.

Preferably, as shown in FIG. 12, the crushing head 40 is angularly mounted on the platform 70 at an angle whereby the crushing head 40 is high enough above the ground that a person may place the wheel W on the crushing head 40 without bending over. The crushing head 40 should therefore illustratively be at a distance D approximately 28 inches to 36 inches off the ground.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A wheel crushing apparatus for crushing scrap vehicle wheels to prepare the scrap wheels for recycling, the scrap wheels having a tire mounted thereon, the apparatus comprising:
    a hydraulic pump,
    a single hydraulic cylinder and piston driven by the hydraulic pump,
    a crushing head adapted to hold the wheel and tire for crushing the wheel,
    a plurality of crushing arms concentric about the crushing head, and radially movable between an extended position wherein the crushing arms contact the tire tread and a contracted position wherein the wheel is crushed, and
    a linkage connecting each of the crushing arms to the single hydraulic piston, whereby all of the crushing arms are driven by the single hydraulic piston between the extended position and the contracted position.

2. The apparatus of claim 1, wherein the crushing head further comprises a guide finger engaging the wheel hub thereby centering the wheel on the crushing head.

3. The apparatus of claim 1, further comprising a mobile platform for transporting the apparatus.

4. The apparatus of claim 3, wherein the mobile platform comprises a trailer attachable to a towing vehicle.

5. The apparatus of claim 4, wherein the crushing head is angularly mounted on the platform at an angle whereby the crushing head is high enough above the ground that a person may place the wheel on the crushing head without bending over.

6. The apparatus of claim 3, wherein the mobile platform comprises a self-powered vehicle.

7. The apparatus of claim 5, wherein the self-powered vehicle comprises an excavator with a retractable arm, the crushing head being mounted on the retractable arm.

8. The apparatus of claim 1, wherein the crushing head further comprises a plurality of radial slots, each crushing arm moving radially in one of the radial slots.

9. The apparatus of claim 1, wherein each crushing arm has a first end and a second end, the first end contacting the tire tread, a fulcrum between the first end and the second end, the crushing arm pivoting on the fulcrum, the second end being pivotally connected to the linkage, the linkage being pivotally connected to the hydraulic piston, whereby movement of the hydraulic piston away from the crushing head causes the crushing arms to pivot on the fulcrum radially toward each other, and whereby movement of the hydraulic piston toward the crushing head causes the crushing arms to pivot on the fulcrum radially away from each other.

10. The apparatus of claim 1, further comprising a tire cutting block centrally mountable on the crushing head.

11. The apparatus of claim 10, wherein the tire cutting block mounts on a guide finger.

12. The apparatus of claim 10, wherein the tire cutting block further comprises a plurality of cutting channels, each cutting channel receiving one of the crushing arms, the tire being removed from the crushed wheel and mounted on the crushing head, the crushing arms forcing the tire against the cutting channels, cutting the tire, and holding one cut tire segment within the cutting channel.

13. The apparatus of claim 12, further comprising a hardened cutting bar mounted in each of the cutting channels and adapted to cut the tire as the tire is forced against the cutting bar.

14. A wheel crushing and tire-cutting apparatus for crushing scrap vehicle wheels to prepare the scrap wheels for recycling, the scrap wheels having a tire mounted thereon, the apparatus comprising:
    a hydraulic pump,
    a single hydraulic cylinder and piston driven by the hydraulic pump,
    a crushing head adapted to hold the wheel and tire for crushing the wheel,
    a plurality of crushing arms concentric about the crushing head, and radially movable between an extended position wherein the crushing arms contact the tire tread and a contracted position wherein the wheel is crushed,
    a linkage connecting each of the crushing arms to the single hydraulic piston, whereby all of the crushing arms are driven by the single hydraulic piston between the extended position and the contracted position, and
    a tire cutting block centrally mountable on the crushing head, wherein the crushing arms cut the tire against the cutting block, and hold the cut segments against the cutting block.

15. The apparatus of claim 14, wherein the crushing head further comprises a guide finger engaging the wheel hub thereby centering the wheel on the crushing head.

16. The apparatus of claim 14, further comprising a mobile platform for transporting the apparatus.

17. The apparatus of claim 16, wherein the crushing head is angularly mounted on the platform at an angle whereby the crushing head is high enough above the ground that a person may place the wheel on the crushing head without bending over.

18. The apparatus of claim 16, wherein the mobile platform comprises a trailer attachable to a towing vehicle.

19. The apparatus of claim 16, wherein the mobile platform comprises a self-powered vehicle.

20. The apparatus of claim 19, wherein the self-powered vehicle comprises an excavator with a retractable arm, the crushing head being mounted on the retractable arm.

21. The apparatus of claim 14, wherein the crushing head further comprises a plurality of radial slots, each crushing arm moving radially in one of the radial slots.

22. The apparatus of claim 14, wherein each crushing arm has a first end and a second end, the first end contacting the tire tread, a fulcrum between the first end and the second end, the crushing arm pivoting on the fulcrum, the second end being pivotally connected to the linkage, the linkage being pivotally connected to the hydraulic piston, whereby movement of the hydraulic piston away from the crushing head causes the crushing arms to pivot on the fulcrum radially toward each other, and whereby movement of the hydraulic piston toward the crushing head causes the crushing arms to pivot on the fulcrum radially away from each other.

23. The apparatus of claim 14, wherein the crushing head further comprises a guide finger engaging the wheel hub thereby centering the wheel on the crushing head, and wherein the tire cutting block mounts on the guide finger after the crushed wheel is removed from the crushing head.

24. The apparatus of claim 14, wherein the tire cutting block further comprises a plurality of cutting channels, each cutting channel receiving one of the crushing arms, the tire being removed from the crushed wheel and mounted on the crushing head, the crushing arms forcing the tire against the cutting channels, cutting the tire, and holding one cut tire segment within the cutting channel.

25. The apparatus of claim 24, further comprising a hardened cutting bar mounted in each of the cutting channels and adapted to cut the tire as the tire is forced against the cutting bar.

26. A wheel crushing apparatus for crushing scrap vehicle wheels to prepare the scrap wheels for recycling, the scrap wheels having a tire mounted thereon, the apparatus comprising:

an engine, a hydraulic pump driven by the engine, a single hydraulic cylinder and piston driven by the hydraulic pump, a crushing head adapted to hold the wheel and tire for crushing the wheel, a plurality of crushing arms concentric about the crushing head, and radially movable between an extended position wherein the crushing arms contact the tire tread and a contracted position wherein the wheel is crushed, and a linkage connecting each of the crushing arms to the single hydraulic piston, whereby all of the crushing arms are driven by the single hydraulic piston between the extended position and the contracted position wherein each crushing arm has a first end and a second end, the first end contacting the tire tread, a fulcrum between the first end and the second end, the crushing arm pivoting on the fulcrum, the second end being pivotally connected to the linkage, the linkage being pivotally connected to the hydraulic piston, whereby movement of the hydraulic piston away from the crushing head causes the crushing arms to pivot on the fulcrum radially toward each other, and whereby movement of the hydraulic piston toward the crushing head causes the crushing arms to pivot on the fulcrum radially away from each other.

27. The apparatus of claim 26, wherein the crushing head further comprises a guide finger engaging the wheel hub thereby centering the wheel on the crushing head.

28. The apparatus of claim 26, further comprising a mobile platform for transporting the apparatus.

29. The apparatus of claim 28, wherein the crushing head is angularly mounted on the platform at an angle whereby the crushing head is high enough above the ground that a person may place the wheel on the crushing head without bending over.

30. The apparatus of claim 28, wherein the mobile platform comprises a trailer attachable to a towing vehicle.

31. The apparatus of claim 28, wherein the mobile platform comprises a self-powered vehicle.

32. The apparatus of claim 31, wherein the self-powered vehicle comprises an excavator with a retractable arm, the crushing head being mounted on the retractable arm.

33. The apparatus of claim 26, wherein the crushing head further comprises a plurality of radial slots, each crushing arm moving radially in one of the radial slots.

34. The apparatus of claim 26, further comprising a tire cutting block centrally mountable on the crushing head.

35. The apparatus of claim 34, wherein the tire cutting block mounts on a guide finger.

36. The apparatus of claim 34, wherein the tire cutting block further comprises a plurality of cutting channels, each cutting channel receiving one of the crushing arms, the tire being removed from the crushed wheel and mounted on the crushing head, the crushing arms forcing the tire against the cutting channels, cutting the tire, and holding one cut tire segment within the cutting channel.

37. The apparatus of claim 36, further comprising a hardened cutting bar mounted in each of the cutting channels and adapted to cut the tire as the tire is forced against the cutting bar.

* * * * *

UNITED STATES PATENT AND TRADEMARK OFFICE
CERTIFICATE OF CORRECTION

PATENT NO. : 5,868,328
DATED : February 9, 1999
INVENTOR(S) : Eugene H. Luoma

It is certified that error appears in the above-identified patent and that said Letters Patent is hereby corrected as shown below:

<u>Column 5 and 6, claims 5-13,</u>
Should read as follows:

5. The apparatus of claim 3, wherein the mobile platform comprises a self-powered vehicle.

6. The apparatus of claim 5, wherein the self-powered vehicle comprises an excavator with a retractable arm, the crushing head being mounted on the retractable arm.

7. The apparatus of claim 1, wherein the crushing head further comprises a plurality of radial slots, each crushing arm moving radially in one of the radial slots.

8. The apparatus of claim 1, wherein each crushing arm has a first end and a second end, the first end contacting the tire tread, a fulcrum between the first end and the second end, the crushing arm pivoting on the fulcrum, the second end being pivotally connected to the linkage, the linkage being pivotally connected to the hydraulic piston, whereby movement of the hydraulic piston away from the crushing head causes the crushing arms to pivot on the fulcrum radially toward each other, and whereby movement of the hydraulic piston toward the crushing head causes the crushing arms to pivot on the fulcrum radially away from each other.

9. The apparatus of claim 1, further comprising a tire cutting block centrally mountable on the crushing head.

10. The apparatus of claim 9, wherein the tire cutting block mounts on the guide finger.

11. The apparatus of claim 9, wherein the tire cutting block further comprises a plurality of cutting channels, each cutting channel receiving one of the crushing arms, the tire being removed from the crushed wheel and mounted on the crushing head, the crushing arms forcing the tire against the cutting channels, cutting the tire, and holding one cut tire segment with the cutting channel.

12. The apparatus of claim 11, further comprising a hardened cutting bar mounted in each of the cutting channels and adapted to cut the tire as the tire is forced against the cutting bar.

13. The apparatus of claim 4, wherein the crushing head is angularly mounted on the platform at an angle whereby the crushing head is high enough above the ground that a person may place the wheel on the crushing head without bending over.

UNITED STATES PATENT AND TRADEMARK OFFICE
CERTIFICATE OF CORRECTION

PATENT NO. : 5,868,328
DATED : February 9, 1999
INVENTOR(S) : Eugene H. Luoma

It is certified that error appears in the above-identified patent and that said Letters Patent is hereby corrected as shown below:

Columns 6 and 7, claims 17-25,
Should read as follows:

17. The apparatus of claim 16, wherein the mobile platform comprises a trailer attachable to a towing vehicle.

18. The apparatus of claim 16, wherein the mobile platform comprises a self-powered vehicle.

19. The apparatus of claim 18, wherein the self-powered vehicle comprises an excavator with a retractable arm, the crushing head being mounted on the retractable arm.

20. The apparatus of claim 14, wherein the crushing head further comprises a plurality of radial slots, each crushing arm moving radially in one of the radial slots.

21. The apparatus of claim 14, wherein each crushing arm has a first end and a second end, the first end contacting the tire tread, a fulcrum between the first end and the end, the crushing arm pivoting on the fulcrum, the second end being pivotally connected to the linkage, the linkage being pivotally connected to the hydraulic piston, whereby movement of the hydraulic piston away from the crushing head causes the crushing arms to pivot on the fulcrum radially toward each other, and whereby movement of the hydraulic piston twoard the crushing head causes the crushing arms to pivot on the fulcrum radially away from each other.

22. The apparatus of claim 14, wherein the crushing head further comprises a guide finger engaging the wheel hub thereby centering the wheel on the crushing head, and wherein the tire cutting block mounts on the guide finger after the crushed wheel is removed from the crushing head.

23. The apparatus of claim 14, wherein the tire cutting block further comprising a plurality of cutting channels, each cutting channel receiving one of the crushing arms, the tire being removed from the crushed wheel and mounted on the crushing head, the crushing arms forcing the tire against the cutting channels, cutting the tire, and holding one cut tire segment within the cutting channel.

24. The apparatus of claim 23, further comprising a hardened cutting bar mounted in each of the cutting channels and adapted to cut the tire as the tire is forced against the cutting bar.

25. The apparatus of claim 16, wherein the crushing head is angularly mounted on the platform at an angle whereby the crushing head is high enough above the ground that a person may place the wheel on the crushing head without bending over.

UNITED STATES PATENT AND TRADEMARK OFFICE
CERTIFICATE OF CORRECTION

PATENT NO. : 5,868,328
DATED : February 9, 1999
INVENTOR(S) : Eugene H. Luoma

It is certified that error appears in the above-identified patent and that said Letters Patent is hereby corrected as shown below:

Column 8, claims 29-37,
Should read as follows:

29. The apparatus of claim 28, wherein the mobile platform comprises a trailer attachable to a towing vehicle.

30. The apparatus of claim 28, wherein the mobile platform comprises a self-powered vehicle.

31. The apparatus of claim 30, wherein the self-powered vehicle comprises an excavator with a retractable arm, the crushing head being mounted on the retractable arm.

32. The apparatus of claim 26, wherein the crushing head further comprises a plurality of radial slots, each crushing arm moving radially in one of the radial slots.

33. The apparatus of claim 26, further comprising a tire cutting block centrally mountable on the crushing head.

34. The apparatus of claim 33, wherein the tire cutting block mounts on the guide finger.

35. The apparatus of claim 33, wherein the tire cutting block further comprises a plurality of cutting channels, each cutting channel receiving one of the crushing arms, the tire being removed from the crushed wheel and mounted on the crushing head, the crushing arms forcing the tire against the cutting channel, cutting the tire, and holding one cut tire segment within the cutting channel.

36. The apparatus of claim 35, further comprising a hardened cutting bar mounted in each of the cutting channels and adapted to cut the tire as the tire is forced against the cutting bar.

UNITED STATES PATENT AND TRADEMARK OFFICE
CERTIFICATE OF CORRECTION

PATENT NO.    : 5,868,328
DATED         : February 9, 1999
INVENTOR(S)   : Eugene H. Luoma It is certified that error appears in the above-identified patent and that said Letters Patent is hereby corrected as shown below:

37. The apparatus of claim 28, wherein the crushing head is angularly mounted on the platform at an angle whereby the crushing head is high enough above the ground that a person may place the wheel on the crushing head without bending over.

Signed and Sealed this

Twenty-second Day of January, 2002

*Attest:*

JAMES E. ROGAN
*Attesting Officer*     *Director of the United States Patent and Trademark Office*